US009679472B2

(12) United States Patent
Gagnon et al.

(10) Patent No.: US 9,679,472 B2
(45) Date of Patent: Jun. 13, 2017

(54) ENERGY CONSUMPTION EVALUATION SYSTEM HAVING REDUCED ENERGY CONSUMPTION

(75) Inventors: Ghyslain Gagnon, Montreal (CA); Tommy Bouchard, Montreal (CA); Olivier Tremblay-Munger, Ste-Julie (CA); Remi Paquette, Blainville (CA); Francois Gagnon, Lasalle (CA)

(73) Assignee: SOCOVAR S.E.C., Montreal (CA)

( * ) Notice: Subject to any disclaimer, the term of this patent is extended or adjusted under 35 U.S.C. 154(b) by 1143 days.

(21) Appl. No.: 13/819,750

(22) PCT Filed: Aug. 30, 2011

(86) PCT No.: PCT/CA2011/050527
§ 371 (c)(1),
(2), (4) Date: Aug. 15, 2013

(87) PCT Pub. No.: WO2012/027844
PCT Pub. Date: Mar. 8, 2012

(65) Prior Publication Data
US 2014/0320314 A1    Oct. 30, 2014

Related U.S. Application Data

(60) Provisional application No. 61/378,193, filed on Aug. 30, 2010.

(51) Int. Cl.
*G08B 23/00* (2006.01)
*G08C 19/02* (2006.01)
(Continued)

(52) U.S. Cl.
CPC ............. *G08C 19/02* (2013.01); *G01D 4/008* (2013.01); *H04L 47/25* (2013.01); *H04Q 9/00* (2013.01);
(Continued)

(58) Field of Classification Search
CPC ........... G08C 19/02; H04Q 9/00; H04L 47/25
(Continued)

(56) References Cited

U.S. PATENT DOCUMENTS 4,858,141 A    8/1989 Hart et al.
5,168,170 A    12/1992 Hartig
(Continued)

FOREIGN PATENT DOCUMENTS

GB    WO-2008/142431 A1 *  5/2008  ............. G01R 22/06
WO    WO2008150458    12/2008
(Continued)

*Primary Examiner* — Kerri McNally
*Assistant Examiner* — Sharmin Akhter
(74) *Attorney, Agent, or Firm* — Norton Rose Fulbright Canada LLP

(57) ABSTRACT

There is described a system for measuring energy consumption of individual electrical devices amongst a plurality of electrical devices. The system is adapted to determine in real time energy consumption while reducing its own consumption of energy by adjusting a transmission rate to between status sensing devices and a consumption evaluation device. The transmission rate is adjusted as a function of learned energy consumption habits and/or consumption characteristics of individual electrical devices.

24 Claims, 5 Drawing Sheets

(51) Int. Cl.
*G01D 4/00* (2006.01)
*H04Q 9/00* (2006.01)
*H04L 12/825* (2013.01)

(52) U.S. Cl.
CPC ... *H04Q 2209/40* (2013.01); *H04Q 2209/823* (2013.01); *H04Q 2209/86* (2013.01); *Y02B 90/247* (2013.01); *Y02B 90/248* (2013.01); *Y04S 20/50* (2013.01); *Y04S 20/52* (2013.01)

(58) Field of Classification Search
USPC ............... 340/870.02, 870.39, 635, 657, 340/693.1–693.3
See application file for complete search history.

(56) References Cited

U.S. PATENT DOCUMENTS

| | | |
|---|---|---|
| 5,196,982 A | 3/1993 | Landsberg et al. |
| 5,301,122 A | 4/1994 | Halpern |
| 5,481,259 A | 1/1996 | Bane |
| 5,483,153 A | 1/1996 | Leeb et al. |
| 6,970,804 B2 | 11/2005 | Siegel et al. |
| 7,034,707 B2 | 4/2006 | Aisa |
| 7,167,452 B2 | 1/2007 | Jameson et al. |
| 7,298,288 B2 | 11/2007 | Nagy et al. |
| 7,385,524 B1 | 6/2008 | Orlosky |
| 7,423,546 B1 | 9/2008 | Aisa |
| 7,498,953 B2 | 3/2009 | Salser, Jr. et al. |
| 7,510,026 B2 | 3/2009 | Pastusek et al. |
| 7,577,542 B2 | 8/2009 | Vacar et al. |
| 7,620,068 B2 | 11/2009 | Stultz et al. |
| 7,624,080 B1 | 11/2009 | Morales et al. |
| 2002/0095269 A1 | 7/2002 | Natalini et al. |
| 2006/0062249 A1 | 3/2006 | Hall et al. |
| 2007/0236362 A1 | 10/2007 | Brian et al. |
| 2009/0154481 A1 | 6/2009 | Han et al. |
| 2009/0185542 A1 | 7/2009 | Zhang et al. |
| 2009/0195349 A1 | 8/2009 | Frader-Thompson et al. |
| 2009/0204348 A1* | 8/2009 | Davis ............... H04W 4/02 702/60 |
| 2009/0309754 A1* | 12/2009 | Bou ............... G01R 15/18 340/870.02 |
| 2010/0026479 A1* | 2/2010 | Tran ............... A61B 5/0006 340/501 |
| 2010/0030393 A1 | 2/2010 | Masters et al. |
| 2010/0188262 A1* | 7/2010 | Reymann ............... G01R 22/10 340/870.02 |
| 2011/0264035 A1* | 10/2011 | Yodfat ............... A61M 5/14248 604/66 |

FOREIGN PATENT DOCUMENTS

| | | |
|---|---|---|
| WO | WO2008155545 | 12/2008 |
| WO | WO2009010892 | 1/2009 |
| WO | WO2009137654 | 11/2009 |

* cited by examiner

ENERGY CONSUMPTION EVALUATION SYSTEM HAVING REDUCED ENERGY CONSUMPTION

CROSS-REFERENCE TO RELATED APPLICATIONS

The present application claims priority under 35 USC 119(e) of U.S. Provisional Patent Application No. 61/378,193, filed on Aug. 30, 2010, the contents of which are hereby incorporated by reference.

TECHNICAL FIELD

The present invention relates to the field of methods and systems for determining individual energy consumption of devices, and particularly individual energy consumption of electrical devices.

BACKGROUND

Due to climate change and global warming, controlling energy consumption has become a serious concern. This includes controlling household electrical energy consumption. In order to reduce their electrical energy consumption, consumers need precise information on the electrical energy consumption of their individual electrical devices. Knowledge about the global consumption is usually insufficient.

Some systems have been developed for determining the individual electrical energy consumption of electrical devices. However, these systems usually include numerous devices such as global consumption measurement devices, which increases the complexity and the cost of these systems.

Therefore, there is a need for an improved system for determining individual electrical energy consumptions of electrical devices.

SUMMARY

There is described herein a system for measuring energy consumption of individual electrical devices amongst a plurality of electrical devices. The system is adapted to determine in real time energy consumption while reducing its own consumption of energy by adjusting a transmission rate between status sensing devices and a consumption evaluation device. The transmission rate is adjusted as a function of learned energy consumption habits and/or consumption characteristics of individual electrical devices.

A global energy consumption measurement device is used to measure a global energy consumption of multiple electrical devices. The global energy consumption may be transmitted wirelessly or via cable. A plurality of individual status sensing devices are used in order to provide at least an on/off status of each individual electrical device. This information may also be transmitted wireless or via cable. The global energy consumption and individual status information are used to determine individual energy consumption.

The status sensing devices may vary, depending on the type of electrical device being sensed, i.e. those with three-pin plugs (computers, televisions, appliances, etc) vs. those that are permanently connected (heater, water-heater, lighting, etc). In some embodiments, the status sensing devices may have a control function.

A consumption evaluation device receives the global energy consumption data and the status sensing devices data and processes the data in order to provide meaningful information to a user via a graphical user interface, such as on a laptop, a desktop computer, a tablet, or a mobile communication device. The consumption evaluation device is configured to execute device identification algorithms, control transmission rates from status sensing devices, and make any necessary adjustments to ensure precision of the results. The device identification algorithms use historical data and other parameters to determine which electrical device is responsible for an increase or decrease in global energy consumption.

In accordance with a first broad aspect, there is provided a method for optimizing a transmission rate between a status sensing device and a consumption evaluation device for determining power consumption of an electrical device, the method comprising: (a) setting an initial transmission rate for the status sensing device to transmit a status signal to the consumption evaluation device; (b) receiving, at the consumption evaluation device, the status signal at the initial transmission rate; (c) learning at least one of consumption characteristics and consumption habits of the electrical device; and (d) modifying the initial transmission rate to an optimized transmission rate taking into account the at least one of the consumption characteristics and the consumption habits of the electrical device.

In accordance with another broad aspect, there is provided a system for determining individual power consumption from a plurality of electrical devices, the system comprising: a plurality of status sensing devices for transmitting status signals indicative of on/off status of the electrical devices; a global energy measurement device for transmitting a global energy consumption signal indicative of a global energy consumption for the plurality of electrical devices; and a consumption evaluation device adapted to receive the global energy consumption signal, and receive the status signals at an initial transmission rate, and configured for learning at least one of consumption characteristics and consumption habits of the electrical devices and modifying the initial transmission rate to an optimized transmission rate by taking into account the at least one of the consumption characteristics and the consumption habits.

The expression "transmission rate" refers to the rate or frequency at which a status sensor sends a status signal. For example, a status sensor may be adapted to send a status signal every thirty seconds, ten minutes, or two hours. A status signal is a signal which indicates whether en electrical device is in operation or not, or an actual reading of a parameter of the electrical device.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1:
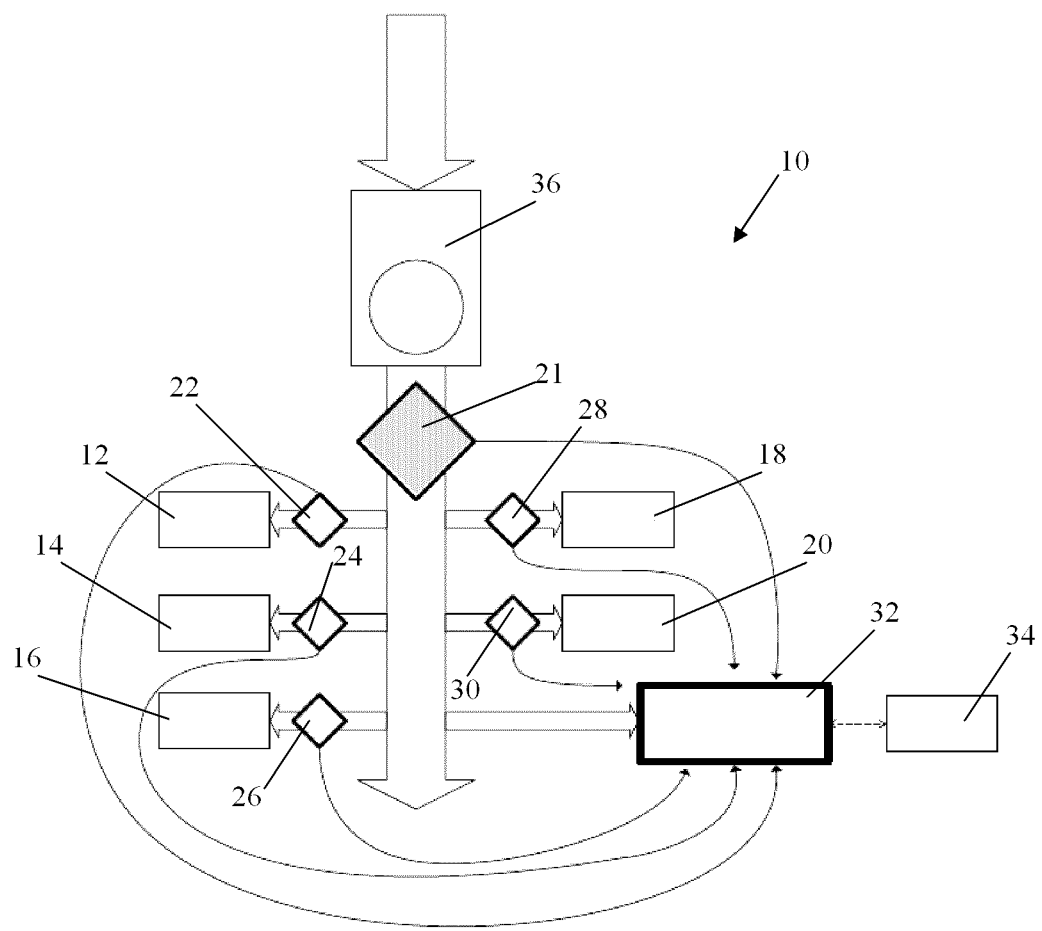
FIG. 1 is a schematic diagram of a system comprising status sensors and a consumption evaluation device for determining individual electrical energy consumption of electrical devices, in accordance with an embodiment.

FIG. 1 illustrates one embodiment of a system for monitoring the individual electrical energy consumption of a plurality of electrical devices 12, 14, 16, 18, and 20 which consume electricity, such as a refrigerator, a humidifier, a dehumidifier, an electric radiator, an air conditioner, and the like. The system 10 comprises a global consumption measurement device 21, a plurality of status sensing devices 22, 24, 26, 28, and 30, a consumption evaluation device 32, and a user interface 34. The global consumption measurement device 21 and the status sensing devices 22, 24, 26, 28, and 30 are connected to the consumption evaluation device 32.

It should be understood that any type of connection allowing the consumption evaluation device 32 to be in communication with the sensors 21, 22, 24, 26, 28, and 30 may be used. In one embodiment, the sensors 21, 22, 24, 26, 28, and 30 are connected to the consumption evaluation device 32 via a cable such as an electrical cable or an optical cable for example. In another embodiment, the consumption evaluation device 32 is connected to the sensors 21, 22, 24, 26, 28, and 30 via wireless communication such as Radio Frequency (RF) communication for example.

The global consumption measurement device 21 is adapted to measure or determine the global electrical energy consumed by all of the electrical devices 12, 14, 16, 18, and 20, and to transmit the measured/determined global electrical energy consumption to the consumption evaluation device 32.

Each status sensor 22, 24, 26, 28, and 30 is associated with an electrical device 12, 14, 16, 18, and 20, respectively and adapted to determine whether its corresponding electrical device 12, 14, 16, 18, and 20, respectively, is in operation. Each status sensor 22, 24, 26, 28, and 30 is also adapted to transmit the on/off status of its respective electrical device 12, 14, 16, 18, and 20 to the consumption evaluation device 32 at a given transmission rate.

In one embodiment, one or more of the sensors 22, 24, 26, 28, and 30 are connected directly or indirectly to a given device. In another embodiment, one or more of the sensors may be connected directly to a power management panel, either at the output of a circuit breaker or integrated within the circuit breaker. In this case, a status sensing device may be connected to a distinct circuit for a given electrical device, such as a heating and ventilation system, electrical appliances, a water heater, etc. In yet another embodiment, one or more of the sensors 22, 24, 26, 28, and 30 is provided inside an electric baseboard.

The sensors 22, 24, 26, 28, and 30 may be adapted to transmit an "on" state to the consumption evaluation device 32 when a current powering a given electrical device is found to be above a predetermined threshold, such as 1 Ampere, and to transmit an "off" state when the current powering the given electrical device is found to be below a predetermined threshold, such as 0.5 Ampere. The upper and lower thresholds may be set as desired. In some embodiments, an actual reading of current may be transmitted instead of simply an on/off status.

In some embodiments, at least one of the sensors 22, 24, 26, 28, and 30 is battery powered using a button cell battery. In some embodiments, at least one of the sensors 22, 24, 26, 28, and 30 use energy harvesting as a power source, and more particularly RF energy harvesting. RF energy available in the immediate surrounding of a sensor may be used to power the sensor in order to lengthen the life span of a sensor or to eliminate the need for a battery component.

Figure 2:
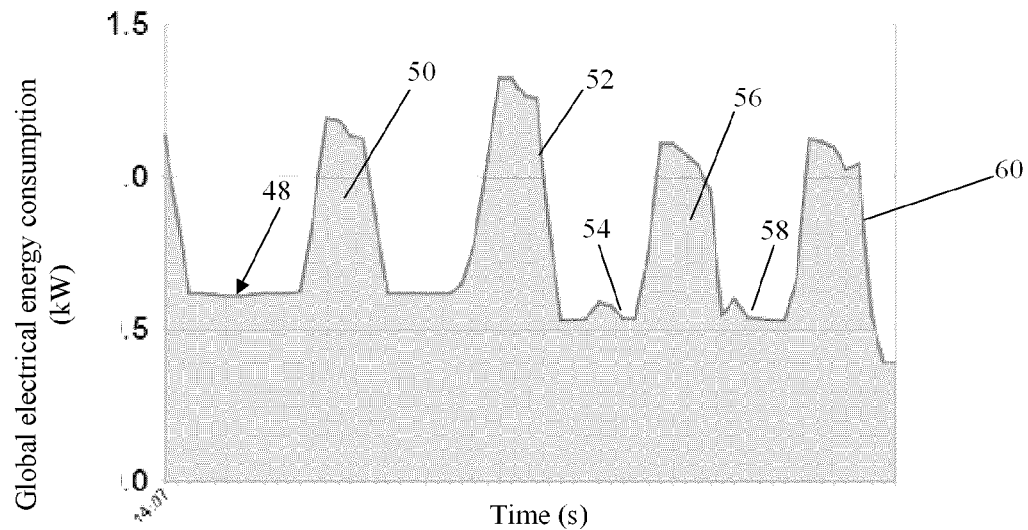
FIG. 2 is a graph of consumed global electrical power as a function of time, in accordance with an embodiment.

The consumption evaluation device 32 receives the on/off status for each electrical device 12, 14, 16, 18, and 20 from the sensor 22, 24, 26, 28, and 30, respectively, and the global electrical energy consumption from the global consumption measurement device 21. FIG. 2 illustrates one exemplary curve of global electrical energy consumption as a function of time. The curve comprises a ground consumption line 48 and consumption peaks 50, 52, 54, 56, 58, and 60. Each peak 50, 52, 54, 56, 58, and 60 is also referred to as an event and corresponds to the operation period of time of at least one electrical device 12, 14, 16, 18, and 20.

The information sent from the global consumption measurement device 21 to the consumption evaluation device 32 may be a value related to the global electrical energy consumption, and the consumption evaluation device 32 is adapted to determine the global electrical energy consumption from the value received from the global consumption measurement device 21.

The consumption evaluation device 32 is adapted to determine the electrical energy consumption for each electrical device 12, 14, 16, 18, and 20 using the global electrical energy consumption received from the global consumption measurement device 21 and the operation status information received from the status sensors 22, 24, 26, 28, and 30. It should be understood that any method known to a person skilled in the art for determining the individual electrical energy consumption of the electrical devices 12, 14, 16, 18, and 20 using the global electrical energy consumption and the on/off status of the electrical devices 12, 14, 16, 18, and 20 may be used.

In one embodiment, the consumption evaluation device is adapted to learn consumption habits and consumption characteristics for each electrical device 12, 14, 16, 18, and 20. In this case, the consumption evaluation device 32 is adapted to determine the individual electrical energy consumption of the electrical devices 12, 14, 16, 18, and 20 using their consumption habits and characteristics in addition to the global electrical energy consumption and the on/off status of the electrical devices 12, 14, 16, 18, and 20.

In one embodiment, the system 10 is provided with a user interface 34 allowing a user to interact with the consumption evaluation device 32. The user interface 34 may be used for entering parameters in the consumption evaluation device 32, controlling the system 10, accessing the consumption results from the consumption evaluation device 32, and the like.

It should be understood that the global consumption measurement device 21, such as a current sensor, may be positioned at any adequate location along the electrical line powering all of the electrical devices 12, 14, 16, 18, and 20. For example, the global consumption measurement device 21 may be located in the vicinity of an electricity meter 36, as illustrated in FIG. 1.

Figure 3:
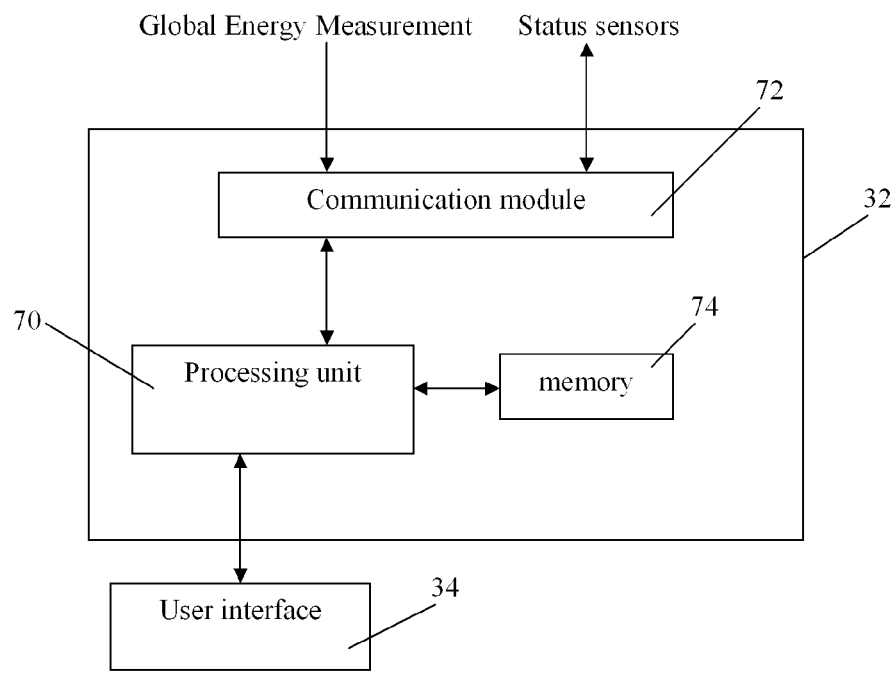
FIG. 3 is a block diagram of the consumption evaluation device of FIG. 1, in accordance with an embodiment.

The consumption evaluation device 32 may be implemented in a plug computer or in a more traditional PC-based apparatus. FIG. 3 illustrates one embodiment of a consumption evaluation device 32 comprising a processing unit 70 connected to a communication unit 72 and a memory 74. The memory 74 receives and stores data. The memory 74 may be a main memory, such as a high speed Random Access Memory (RAM), or an auxiliary storage unit, such as a hard disk, a floppy disk, or a magnetic tape drive. The memory may be any other type of memory, such as a Read-Only Memory (ROM), or optical storage media such as a videodisc and a compact disc.

The processing unit 70 may access the memory 74 to retrieve data. The processing unit 70 may be any device that can perform operations on data. Examples are a central processing unit (CPU), a front-end processor, a microprocessor, a graphics processing unit (GPU/VPU), a physics processing unit (PPU), a digital signal processor, and a network processor. Applications may be coupled to the processing unit 70 and configured to perform various tasks.

The consumption evaluation device 32 receives the global electrical energy consumption and the on/off status from the global consumption measurement device 21 and the status sensors 22, 24, 26, 28, and 30, respectively, via the communication unit 74. The processing unit 70 is configured for determining the individual electrical energy consumption of the electrical devices 12, 14, 16, 18, and 20 using the global electrical energy consumption and the on/off status information received from the status sensors 22, 24, 26, 28, and 30.

In one embodiment, the processing unit 70 is configured for setting the transmission rate of each status sensor 22, 24, 26, 28, and 30 to an optimal value in order to reduce the energy consumption of the sensors 22, 24, 26, 28, and 30. In this case, the processing unit 70 is configured to implement the steps of the method 100 illustrated in FIG. 4.

In order to set the transmission rate of the status sensors 22, 24, 26, 28, and 30 to an optimal value, thereby ensuring a predetermined precision in the determination of the individual electrical energy consumptions while minimizing the energy consumption of the status sensors 22, 24, 26, 28, and 30, the processing unit 70 is configured to take into account the consumption habits and the consumption characteristics of the electrical devices 12, 14, 16, 18, and 20 for determining the individual electrical energy consumptions. The habits of an electrical device 12, 14, 16, 18, and 20 comprise elements such as the time of day at which the electrical device 12, 14, 16, 18, and 20 is usually used, the day(s) of the week during which the electrical device 12, 14, 16, 18, and 20 is usually used, any correlation between the operation of the electrical device 12, 14, 16, 18, and 20 and influence factors, and the like. An influence factor is an external factor which influences the electrical energy consumption of an electrical device 12, 14, 16, 18, and 20. Examples of influence factors comprise an exterior temperature, a humidity level, and the like. The consumption characteristics of the electrical devices 12, 14, 16, 18, and 20 comprise characteristics of the curve of electrical power consumed by the electrical device 12, 14, 16, 18, and 20. Examples of consumption characteristics of an electrical device 12, 14, 16, 18, and 20 comprise the usual amount of electrical energy consumed or the usual range of electrical energy consumed by the electrical device 12, 14, 16, 18, and 20, the waveform of the consumed electrical power during the starting and stopping periods of the electrical device 12, 14, 16, 18, and 20, the harmonic distortion level of the electrical power consumed by the electrical device 12, 14, 16, 18, and 20, and the like.

Figure 4:
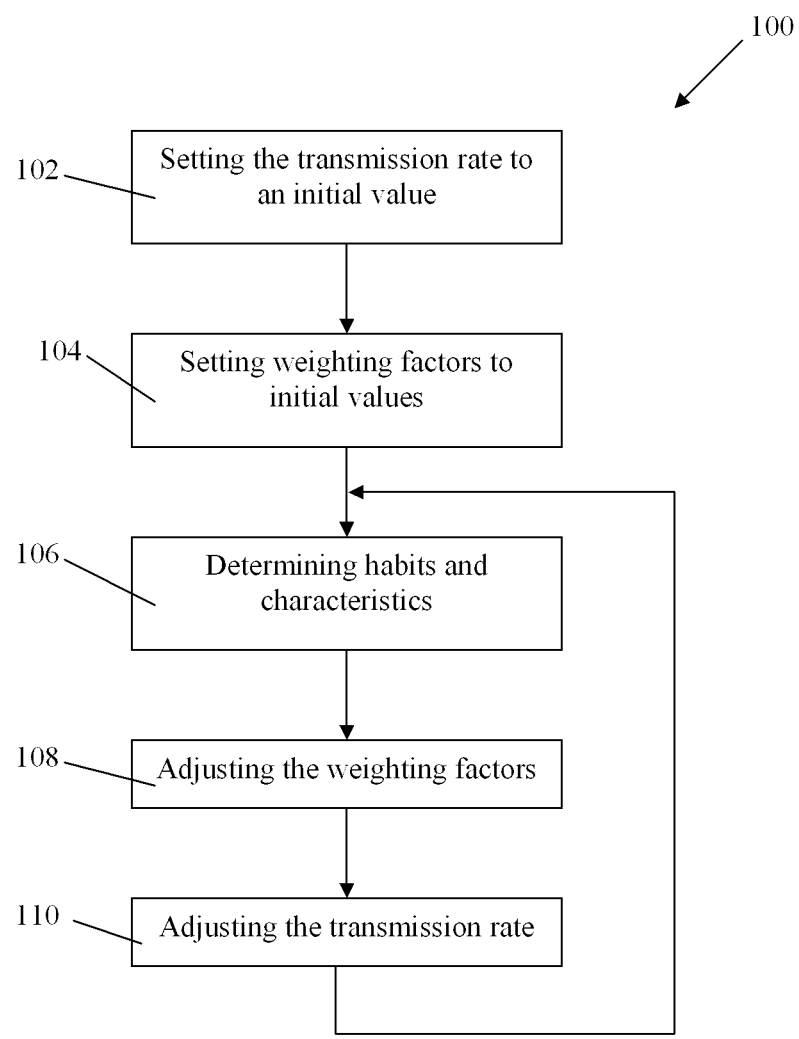
FIG. 4 is a flow chart illustrating a method for optimizing a transmission rate of status sensors in the system of FIG. 1, in accordance with an embodiment.

Referring to FIG. 4, the first step 102 comprises setting the transmission rate of each status sensor 22, 24, 26, 28, and 30 to an initial value. In one embodiment, the transmission rate for each status sensor 22, 24, 26, 28, and 30 is set to an initial value sufficiently high for allowing a precise determination of the individual electrical energy consumption of the electrical devices 12, 14, 16, 18, and 20. Different status sensors 22, 24, 26, 28, and 30 may have different initial transmission rate values.

The second step 204 comprises, for each electrical device 12, 14, 16, 18, and 20, setting weighting factors for the habits, the characteristics, and the activity of the sensor 22, 24, 26, 28, and 30 associated with the electrical device 12, 14, 16, 18, and 20 to initial values. The weighting factors represent the importance granted to their corresponding element in the determination of the individual electrical energy consumption of the electrical devices 12, 14, 16, 18, and 20. For example, if the weighting factor associated with the habits of a particular electrical device 12, 14, 16, 18, and 20 is set to a very high value, the processing unit 70 will mainly consider the habits of the particular electrical device 12, 14, 16, 18, and 20 when determining the individual electrical energy consumption and other factors will have negligible impacts on the outcome.

In one embodiment, the memory 74 comprises a database of habits and/or characteristics for different types of electrical devices 12, 14, 16, 18, and 20. The user of the system 10 identifies the type of device to which each status sensor 22, 24, 26, 28, and 30 is associated, and the processing unit 70 determines the initial transmission rate, the initial weighting factors, and the initial habits and/or characteristics, if any, using the database.

In one embodiment, at the beginning of the method 100, some habits and/or characteristics of the electrical device 12, 14, 16, 18, and 20 are unknown while others are known. In this case, an initial weighting factor value is given to each known habit and/or characteristic while weighting factors associated with the unknown habits and/or characteristics are set to zero.

In the same or another embodiment, estimations for some or all of the habits and/or characteristics may be entered by the user. For example, a user may estimate that a dishwasher will be used every three days around 8:00 pm. An estimated range of electrical energy consumed by the dishwasher may also be entered.

In one embodiment, at the beginning of the method 100, the sensor activity is considered as the most important factor for determining the individual electrical consumption of the electrical devices 12, 14, 16, 18, and 20. In this case, the weighting factor associated with the sensor activity is given a high initial value so that the determination of the individual electrical consumptions of the electrical devices 12, 14, 16, 18, and 20 at the beginning of the method 100 is mainly based on the global electrical energy consumption and the on/off status information of the electrical devices 12, 14, 16, 18, and 20.

The next step 106 comprises determining habits and characteristics for each electrical device 12, 14, 16, 18, and 20 from historical information from individual electrical energy consumption of the electrical device 12, 14, 16, 18, and 20. In order to determine the individual electrical energy consumptions, the processing unit 70 receives the global electrical energy consumption from the global consumption measurement device 21 and for each event in the global electrical consumption such as peaks 50, 52, 54, 56, 58, and 60 illustrated in FIG. 2, the processing unit 70 determines the contribution of the electrical devices 12, 14, 16, 18, and 20 to the increase/decrease of the global electrical energy consumption using the global electrical consumption, the weighting factors, the on/off status information, and the habits and/or characteristics for the electrical devices 12, 14, 16, 18, and 20, if any.

In one embodiment, no habits and characteristics are known before starting the method 100 and the weighting factors for the habits and the characteristics are all set to zero at step 104. In this case, the processing unit 70 starts determining the individual electrical energy consumption for the devices 12, 14, 16, 18, and 20 using only the on/off status information and the global electrical energy consumption. The individual electrical energy consumption as a function of time for each electrical device 12, 14, 16, 18, and 20 constitutes historical information which is used by the processing unit 70 for determining habits of the electrical device 12, 14, 16, 18, and 20. For example, if the processing unit 70 determines that a particular electrical device 12, 14, 16, 18, and 20 is in operation every day at a same hour, this becomes a consumption habit for the particular electrical device 12, 14, 16, 18, and 20, which is stored into memory 74. Furthermore, when it identifies that a particular electrical device 12, 14, 16, 18, and 20 is responsible for a change in the global electrical consumption, the processing unit 70 determines the consumption characteristics of the particular electrical device 12, 14, 16, 18, and 20 from the characteristics of the curve at the time of the change. For example, the electrical power or the range of electrical power consumed by the particular device 12, 14, 16, 18, and 20 may be determined from the height of a peak, and the waveform and the harmonic distortion level of the electrical power consumed by the electrical device 12, 14, 16, 18, and 20 may be determined from the waveform and the harmonic distortion level of the peak in the global electrical energy consumption.

Once the habits and characteristics for the electrical devices 12, 14, 16, 18, and 20 have been determined, the processing unit 70 adjusts, at step 108, the value for the weighting factors associated with the habits, the characteristics, and the sensor activity. If a particular electrical device 12, 14, 16, 18, and 20 strictly follows some habits, the weighting factors for these habits will be set to a higher value. If another electrical device 12, 14, 16, 18, and 20 does not have a strong regularity in its habits but has substantially a same waveform of consumed power while in operation, then the weighting factor for the waveform characteristic is set to a higher value while that of the habits and the sensor activity are each set to a lower value.

In one embodiment in which initial habits and characteristics have been entered by the user, the processing unit 70 determines the individual electrical energy consumptions using the weighting factors associated with the initial habits and characteristics, and the sensor activity. From the individual electrical energy consumptions, the processing unit 70 adjusts the initial habits and characteristics, at step 106, and the weighting factors for the habits, the characteristics, and the sensor activity, at step 108.

Once the weighting factors have been adjusted, the processing unit 70 adjusts, at step 110, the transmission rate for the status sensors 22, 24, 26, 28, and 30 associated with the electrical devices 12, 14, 16, 18, and 20 as a function of the adjusted weighting factor associated with the sensor activity of the electrical devices 12, 14, 16, 18, and 20, respectively.

In one embodiment in which the weighting factor for the sensor activity associated with a particular electrical device 12, 14, 16, 18, and 20 is increased at step 108, the transmission rate of the status sensor 22, 24, 26, 28, and 30 associated with the particular electrical device 12, 14, 16, 18, and 20 is increased and more importance is given to the status information in the next determination of the individual electrical energy consumption.

In another embodiment in which the weighting factor for the sensor activity associated with a particular electrical device 12, 14, 16, 18, and 20 is decreased at step 108, the transmission rate of the status sensor 22, 24, 26, 28, and 30 associated with the particular electrical device 12, 14, 16, 18, and 20 is decreased at step 110, and less importance is given to the status information in the next determination of the individual electrical energy consumption. For example, when the weighting factor for the sensor activity is set to a high initial value at step 104, step 108 comprises increasing the weighting factors for the habits and characteristics and decreasing that of the sensor activity while the habits and characteristics are being determined. Since the value of the weighting factor for the sensor activity decreases, the transmission rate also decreases which reduces the electrical energy consumption of the status sensor 22, 24, 26, 28, and 30.

The steps 106, 108, and 110 are repeatedly and cyclically performed and a steady-state may be reached, i.e. the transmission rate for each status sensor 22, 24, 26, 28, and 30 reaches an optimal value. The method 100 allows to maintain an optimal value for the transmission rate of the status sensors 22, 24, 26, 28, and 30 even when the habits and/or characteristics of an electrical device 12, 14, 16, 18, and 20 changes over time. The optimal value for the transmission rate ensures a precise determination of the individual electrical energy consumption while maintaining the transmission of the status information from the status sensors 22, 24, 26, 28, and 30 to a minimum value, and therefore reducing the energy consumption of the status sensors 22, 24, 26, 28, and 30.

Once the habits and characteristics of the electrical devices 12, 14, 16, 18, and 20 have been determined, the identification of the electrical device responsible for an increase/decrease in global electrical energy consumption and the determination of the individual electrical energy consumptions are mainly performed using the habits and the characteristics of the electrical devices 12, 14, 16, 18, and 20. For example, if it determines that each time a refrigerator starts consuming electricity, the global electrical energy consumption increases by 250 W with a harmonic distortion level of 13%, the processing unit 70 identifies the 250 W consumption and the 13% harmonic distortion level as being characteristics of the refrigerator. The next time the global electrical energy consumption will increase by 250 W with a harmonic distortion level of 13%, the processing unit 70 will attribute the increase in global electrical energy consumption to the operation of the refrigerator without needing to receive on/off status information from the status sensor associated with the refrigerator.

Figure 5:
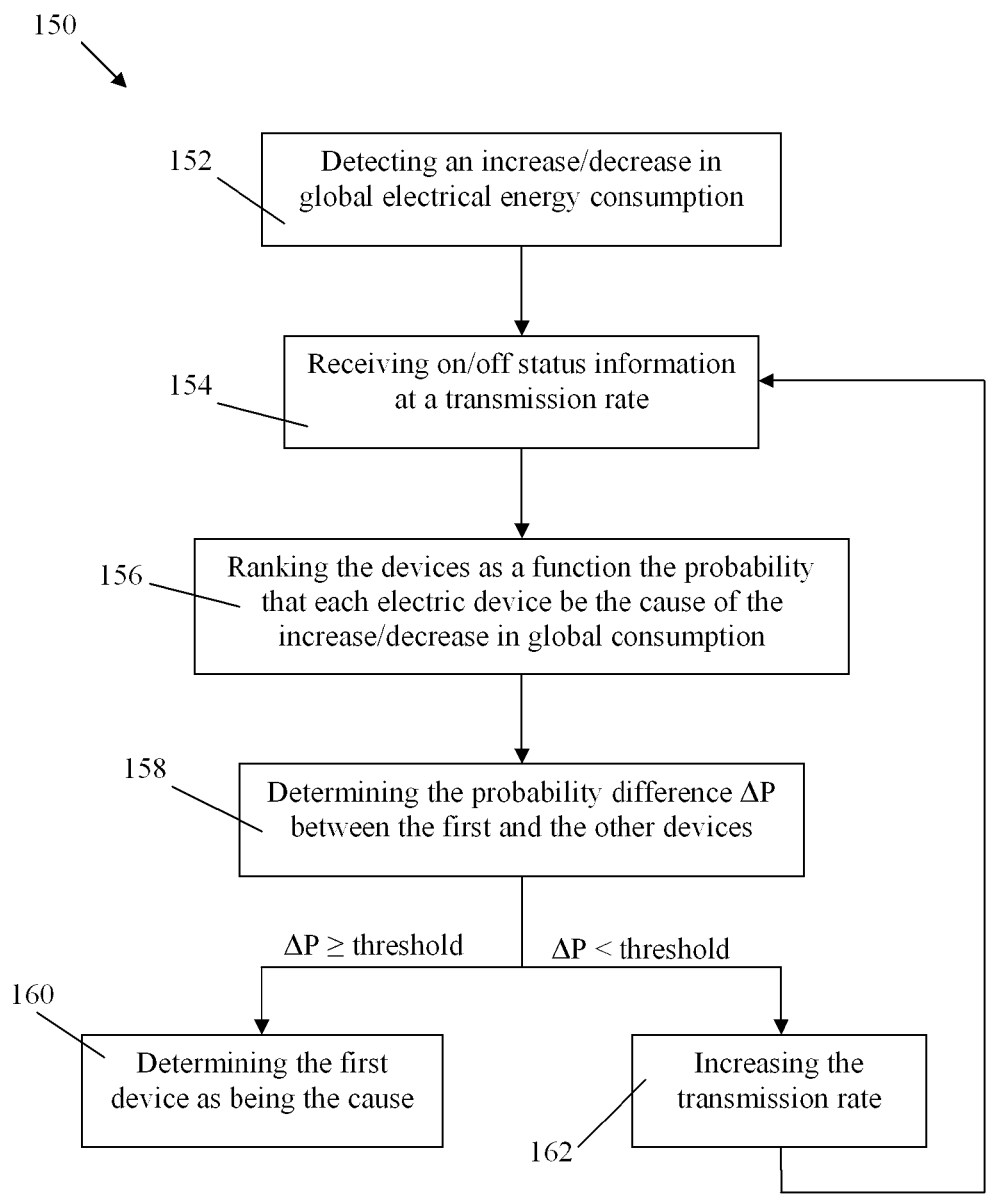
FIG. 5 is a flow chart illustrating a method for identifying a cause of an increase/decrease in global electrical energy consumption, in accordance with an embodiment.

FIG. 5 illustrates one embodiment of a method 150 for determining the cause of an event. The first step 152 comprises detecting an increase/decrease, such as peak 50, 52, 54, 56, 58, and 60 illustrated in FIG. 2, in the global electrical energy consumption received from the global consumption measurement device 21. The second step 154 comprises receiving on/off status signals which are transmitted by the status sensors 22, 24, 26, 28, and 30, each at a respective transmission rate. Each status signal indicates whether the corresponding electrical device 12, 14, 16, 18, and 20 is in operation.

The next step 156 comprises determining the probability that each electrical device 12, 14, 16, 18, and 20 be the cause of the increase/decrease in the global electrical energy consumption. It should be understood that any adequate statistic or probabilistic method may be used.

In one embodiment, the probabilities that the electrical devices 12, 14, 16, 18, and 20 be the cause of the event are calculated using only the global electrical energy consumption and the on/off status information.

In another embodiment, the probabilities that the electrical devices 12, 14, 16, 18, and 20 be the cause of the event are calculated using the global electrical energy consumption, the on/off status information, the habits and characteristics of the electrical devices 12, 14, 16, 18, and 20, and the weighting factors.

Once the probabilities have been calculated, the electrical devices 12, 14, 16, 18, and 20 are ranked as a function of their probability of being the cause of the event. The electrical device 12, 14, 16, 18, and 20 having the highest probability is ranked first, the electrical device 12, 14, 16, 18, and 20 having the second highest probability is ranked second, etc.

At step 158, the difference in probability ΔP between the first device and each one of the other electrical devices is determined. If each difference in probability is greater than or equal to a predetermined threshold, then the first device having the highest probability is identified as being the cause of the event (step 160). In this case, most or all of the increase/decrease in global electrical energy consumption is attributed to the first electrical device.

Alternatively, if at least one difference in probability is less than the threshold, then the cause of the event cannot be clearly established. In this case, the change in global electrical energy consumption is attributed to the electrical devices 12, 14, 16, 18, and 20 as a function of the calculated probabilities. Furthermore, the transmission rate of the first electrical device and that of the electrical devices of which the difference in probability with the first electrical device is below the threshold are increased (step 162). For example, if the difference in probability between the first and second devices and that between the first electrical device and the third device are below the threshold, then the first, second, and third devices are considered as potential causes of the event. In order to identify which one of these three devices is the cause of the event, the transmission rate of the status sensors associated with these three devices is increased. In order to identify which one of these three devices is the cause of the event, and to prevent any ambiguity at the next occurrence of a similar event, the transmission rate of the status sensors associated with these three devices may be increased.

After increasing the transmission rate, the method 150 may be repeated until identification of the cause of the event.

In one embodiment, after determining which device 12, 14, 16, 18, and 20 is the cause of the event, the increased transmission rate from step 162 is reduced to its previous value.

It should be understood that the method 150 may be used in combination with the method 100. The processing unit 70 may be configured for performing the steps of the method 150 for determining the cause of an event and subsequently determining the individual electrical energy consumptions which are used for determining the habits and characteristics.

Any global consumption measurement device 21 adapted to measure or determine the global consumption of electrical energy may be used. For example, the global consumption measurement device 21 may be a power meter. The global consumption measurement device 21 may be adapted to determine characteristics of the current, such as the intensity and/or the voltage, from which the energy consumed by all of the electrical devices 12, 14, 16, 18, and 20 can be determined. The global consumption measurement device 21 may be adapted to determine the global electrical energy consumption from the measured current characteristics, and send it to the consumption evaluation device. Alternatively, the global consumption measurement device 21 may be adapted to transmit the measured characteristics of the current to the consumption evaluation device which is adapted to determine the consumed global electrical energy from the measured characteristics.

In one embodiment, the global consumption measurement device 21 is adapted to continuously determine and transmit the actual electrical energy consumption. In another embodiment, the global consumption measurement device 21 is adapted to transmit a signal to the consumption evaluation device 32 each time a predetermined amount of electrical energy has been consumed.

Figure 6:
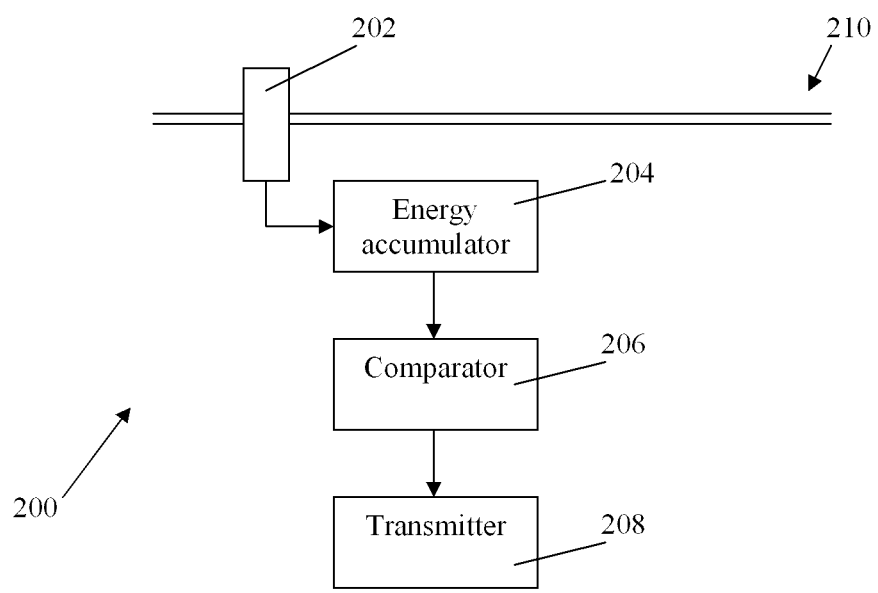
FIG. 6 is a block diagram of a status sensor, in accordance with an embodiment.

FIG. 6 illustrates one embodiment of a global consumption measurement device 200 adapted to measure the electrical power transmitted in an electrical conductor. The global consumption measurement device 200 may be used in the system 10 for measuring and transmitting the global electrical consumption to the consumption evaluation device 32. The global consumption measurement device 200 is adapted to transmit a signal each time a predetermined amount of electrical energy has circulated in the electric conductor.

In one embodiment, the global consumption measurement device 200 comprises a transformer 202, an energy accumulator 204, a comparator 206, and a transmitter 208. The transformer 202 is connected to an electrical cable 210 in which the electrical current circulates. The transformer 202 collects the electromagnetic field generated by the electrical current that circulates in the electrical cable 210 and stores the accumulated electrical energy into the energy accumulator 204. The electrical energy collected by the transformer 202 is related to the amount of electrical energy circulating in the electrical cable 210 in a deterministic manner so that it is possible to determine the amount of electrical energy circulating in the electrical cable 210 from the amount of energy collected by the transformer 202.

The energy accumulator 204 is connected to the comparator which compares the electrical energy accumulated into the energy accumulator 204 to a threshold. Each time the accumulated energy reaches the threshold, the transmitter 208 transmits a signal indicating that the threshold has been reached. For example, a signal may be sent each time an amount of electrical energy equal to 600 J has been accumulated in the energy accumulator 204.

In one embodiment, the energy accumulated in the accumulator 204 is used for powering the comparator 206 and the transmitter 208.

In one embodiment, the global consumption measurement device 200 is used in the system 10 in order to determine the global electrical energy consumption of the electrical devices 12, 14, 16, 18, and 20. In this case, each time it receives a signal from the transmitter 208, the consumption evaluation device 32 determines the amount of global electrical energy that has been consumed from the deterministic relation.

In one embodiment, the signal sent by the transmitter 208 comprises an element of a series. For example, the series may be "1-5-8-12". Each time it receives an element of the series, the consumption evaluation device 32 determines that an amount of electrical energy equal to the threshold has been consumed. Furthermore, the consumption evaluation device 32 compares the received elements to the series in order to determine whether all of the signals sent by the transmitter 208 have been received. For example, if the threshold is set to 600 J and the consumption evaluation device 32 receives successively two signals comprising the elements "1" and "12", respectively, the consumption evaluation device 32 determines that two other signals have been transmitted by the transmitter 208 but have not been received. As a result, the consumption evaluation device 32 determines the global electrical energy consumption taking into account the two non-received signals, and determines the total electrical energy consumption as being equal to four times the threshold, i.e. 2400 J.

In one embodiment, when the number of errors, i.e. the number of non-received signals, reaches a predetermined maximum limit, the consumption evaluation device 32 orders the transmitter 208 to increase the power of emission of the signal. It should be understood that in this case the transmitter 208 is also capable of receiving signals. Alternatively, the global consumption measurement device 200 may be provided with a receiver.

The increase of the emission power implies that the accumulator accumulates more electrical energy for powering the transmitter 208 and the threshold corresponding to the transmission of a signal increases. This changes the deterministic relationship and the consumption evaluation device 32 determines the global electrical energy consumption using the new deterministic relationship.

In one embodiment, the global consumption measurement device 200 comprises no transmitter. For example, the comparator 206 may be electrically or optically connected to the consumption evaluation device 32.

It should be understood that any adequate status sensor 22, 24, 26, 28, and 30 adapted to detect whether an electrical device is in operation may be used. In one embodiment, the status sensor 22, 24, 26, 28, and 30 comprises a status detector adapted to detect whether the electrical device is in operation, an energy source, and a transmitter.

In one embodiment, the status sensor comprises a split-core current transformer connected to a transmitter. The split-core current transformer is inserted around a power cable comprising two electrical conductors for powering an electrical device. The split-core current transformer detects electrical energy circulating in the power cable and a signal is transmitted by the transmitter. Furthermore, the electrical energy collected by the split-core current transformer may be used for powering the transmitter.

In another embodiment, the status sensor comprises a piezoelectric transducer for collecting energy required for powering the status sensor from vibrations. This type of status sensor may be used in combination with a vibrating electrical device such as a washing machine, a refrigerator, a clothes dryer, and the like. The status sensor may use the vibrations of the electrical device for detecting whether the electrical device is in operation. Alternatively, any adequate status detection means may be used such as a transformer for detecting the presence of electromagnetic waves for example.

In a further embodiment, the status sensor uses as a power source thermal energy generated by an electrical device such as a heat pump, an electric radiator, and the like.

In one embodiment, the status sensors are integrated into power plugs. Alternatively, the status sensors may be integrated into circuit breakers.

In one embodiment, at least one of the status sensors are a multi-level sensor adapted to detect more than two statuses for its corresponding device. For example, a multi-level status sensor can be adapted to determine the on, off, and stand-by status of a device such as a TV, a DVD player, or the like. In another example, the multi-level status sensor can be adapted to determine the operation cycle of its corresponding device. For example, such a status sensor can be connected to a washing machine, a tumble dryer, or the like. In the case of a washing machine, the status sensor may be adapted to determine the particular operation cycle of the washing machine, i.e. a particular wash cycle, the spin cycle, the freshening cycle, or the like.

While the present description refers to the use of weighting factors for adjusting the transmission rate of the status sensors, it should be understood that any adequate artificial intelligence method may be used. For example, any adequate neural network method adapted to find patterns in data may be used for determining the optimal transmission rate for the status sensors.

While the present description refers to a system and method for monitoring the individual electrical energy consumption of devices, it should be understood that the system and method can be adapted to monitor consumption of consumables other than electricity. For example, the system and method can be adapted to monitor the individual device consumption of water, fuel, natural gas, or the like.

While illustrated in the block diagrams as groups of discrete components communicating with each other via distinct data signal connections, it will be understood by those skilled in the art that the present embodiments are provided by a combination of hardware and software components, with some components being implemented by a given function or operation of a hardware or software system, and many of the data paths illustrated being implemented by data communication within a computer application or operating system. The structure illustrated is thus provided for efficiency of teaching the present embodiment.

It should be noted that the present invention can be carried out as a method, can be embodied in a system, a computer readable medium or an electrical or electromagnetic signal. The embodiments of the invention described above are intended to be exemplary only. The scope of the invention is therefore intended to be limited solely by the scope of the appended claims.

What is claimed is:

1. A method for optimizing a transmission rate between a status sensing device and a consumption evaluation device for determining power consumption of an electrical device, the method comprising:
   (a) setting an initial transmission rate for the status sensing device to transmit a status signal indicative of an on/off status of the electrical device to the consumption evaluation device;
   (b) receiving, at the consumption evaluation device, the status signal at the initial transmission rate;
   (c) learning at least one of consumption characteristics and consumption habits of the electrical device; and
   (d) reducing the initial transmission rate to an optimized transmission rate as the at least one of the consumption characteristics and the consumption habits of the electrical device are learned.

2. The method of claim 1, wherein modifying the initial transmission rate comprises sending a signal from the consumption evaluation device to the status sensing device to set the optimized transmission rate.

3. The method of claim 1, wherein steps (c) and (d) are repeated until the optimized transmission rate is reached.

4. The method of claim 1, wherein said learning at least one of consumption characteristics and consumption habits comprises associating weighting factors to each one of the consumption characteristics and consumption habits, for use in determining power consumption of the electrical device in combination with the status signal.

5. The method of claim 4, wherein associating weighting factors comprises associating a weighting factor to sensor activity.

6. The method of claim 4, wherein modifying the initial transmission rate also comprises adjusting the weighting factors used in determining power consumption of the electrical device.

7. The method of claim 1, wherein learning at least one of consumption characteristics and consumption habits of the electrical device comprises receiving a signal indicative of a global electrical consumption for a plurality of electrical devices and extracting data therefrom.

8. The method of claim 7, wherein extracting data comprises determining which one from the plurality of electrical devices is responsible for a change in the global electrical consumption.

9. The method of claim 8, wherein determining which one from the plurality of electrical devices is responsible for the change comprises, for each one of the plurality of electrical devices, determining a probability of being responsible for the change and ranking the electrical devices as a function of the probability.

10. The method of claim 9, wherein determining which one from the plurality of electrical devices is responsible for the change further comprises:
when a difference in the probability between a first and a second of the ranking is equal to or above a threshold, identifying the first electrical device as being responsible; and
when the difference is below the threshold:
identifying at least two of the electrical devices as being potentially responsible;
increasing a transmission rate for the at least two electrical devices; and
considering the status signal for each one of the at least two electrical devices to determine which one is responsible for the change.

11. The method of claim 9, wherein determining a probability comprises taking into account any one of global electrical consumption, sensor activity, consumption habits, and consumption characteristics of the electrical devices.

12. A system for determining individual power consumption from a plurality of electrical devices, the system comprising:
a plurality of status sensing devices for transmitting status signals indicative of on/off status of the electrical devices;
a global energy measurement device for transmitting a global energy consumption signal indicative of a global energy consumption for the plurality of electrical devices; and
a consumption evaluation device adapted to receive the global energy consumption signal, and receive the status signals at an initial transmission rate, and configured for learning at least one of consumption characteristics and consumption habits of the electrical devices and reducing the initial transmission rate to an optimized transmission rate as the at least one of the consumption characteristics and the consumption habits are learned.

13. The system of claim 12, wherein at least one of the status sensing devices is connected to one of the plurality of electrical devices.

14. The system of claim 12, wherein at least one of the status sensing devices comprises:
a transformer connected to an electrical cable in which electrical current circulates and adapted to collect an electromagnetic field generated by the electrical current;
an energy accumulator to store electrical energy accumulated by the transformer;
a comparator connected to the energy accumulator and adapted to compare the electrical energy stored to a threshold; and
a transmitter connected to the comparator and adapted to transmit the status signal when the threshold has been reached.

15. The system of claim 14, wherein the comparator is powered by the electrical energy stored in the energy accumulator.

16. The system of claim 12, wherein at least one of the status sensing devices is adapted to transmit the status signals wirelessly.

17. The system of claim 12, wherein at least one of the status signals comprises a series of elements that are known to the consumption evaluation device and used to confirm reception of a given status signal.

18. The system of claim 17, wherein the consumption evaluation device is adapted to send a signal to the status sensing devices to increase an emission power when errors are detected in the status signals.

19. The system of claim 12, wherein at least one of the status sensing devices comprises:
a status detector for detecting whether an electrical device is in operation; and
a transmitter.

20. The system of claim 19, wherein the status detector comprises a split-core current transformer provided around a power cable and is connected to the transmitter.

21. The system of claim 20, wherein electrical energy collected by the split-core current transformer powers the transmitter.

22. The system of claim 12, wherein at least one of the status sensing devices comprises a piezoelectric transducer for collecting energy from vibrations as a power source.

23. The system of claim 12, wherein at least one of the status sensing devices is a multi-level sensor adapted to detect more than two status for a corresponding electrical device.

24. A non-transitory computer readable medium having computer executable instructions stored thereon for execution by a processor to perform the method of claim 1.

* * * * *